Sept. 9, 1924.  H. HAGENBECK ET AL  1,508,318
ANIMAL INCLOSURE
Filed Jan. 14. 1924  3 Sheets-Sheet 1
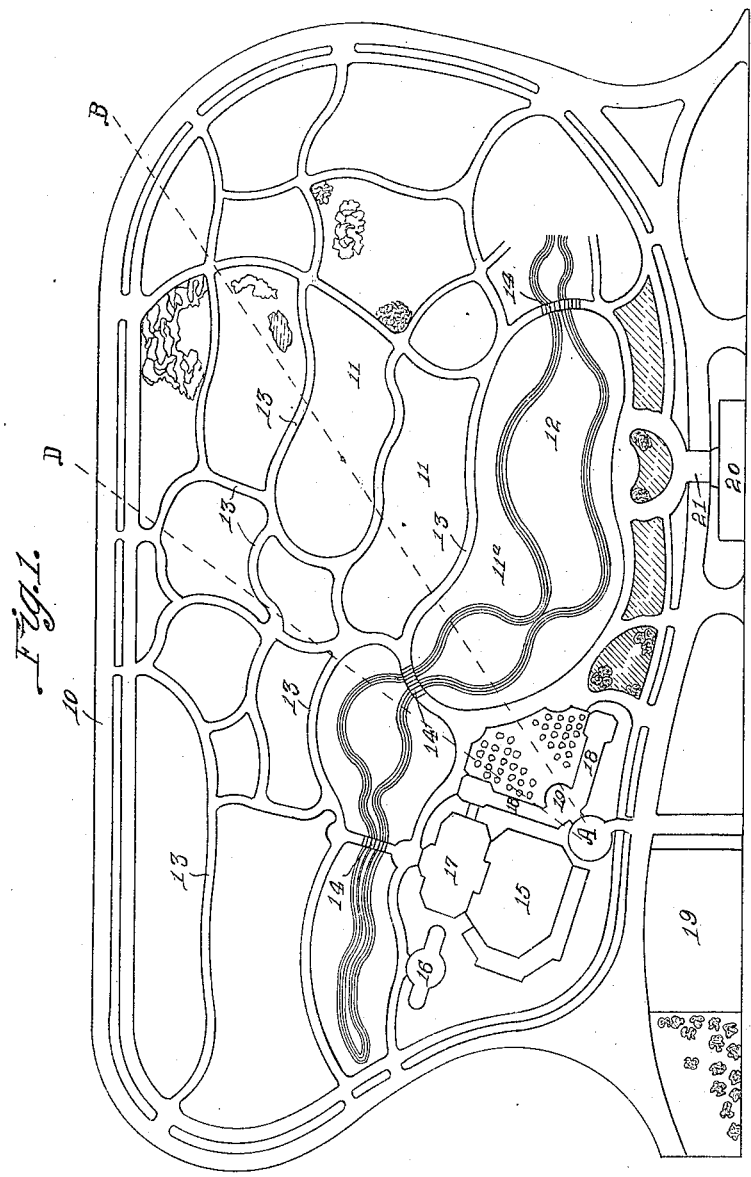
Heinrich Hagenbeck
Lorenz Hagenbeck
INVENTOR
BY Victor J. Evans
ATTORNEY
WITNESS:

Sept. 9, 1924. 1,508,318
H. HAGENBECK ET AL
ANIMAL INCLOSURE
Filed Jan. 14, 1924 3 Sheets-Sheet 2
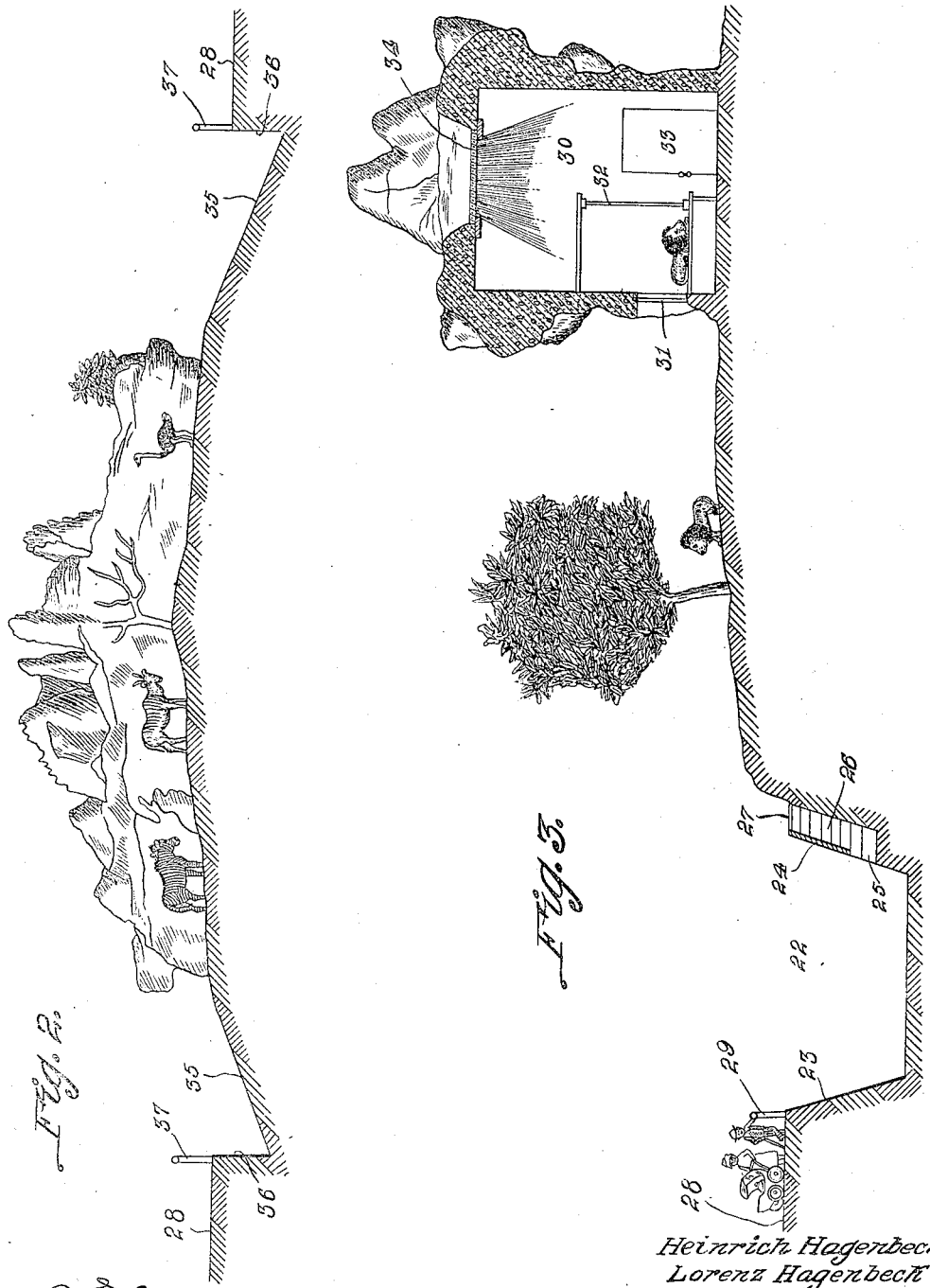
Heinrich Hagenbeck
Lorenz Hagenbeck
INVENTOR
BY Victor J. Evans
ATTORNEY
WITNESS:

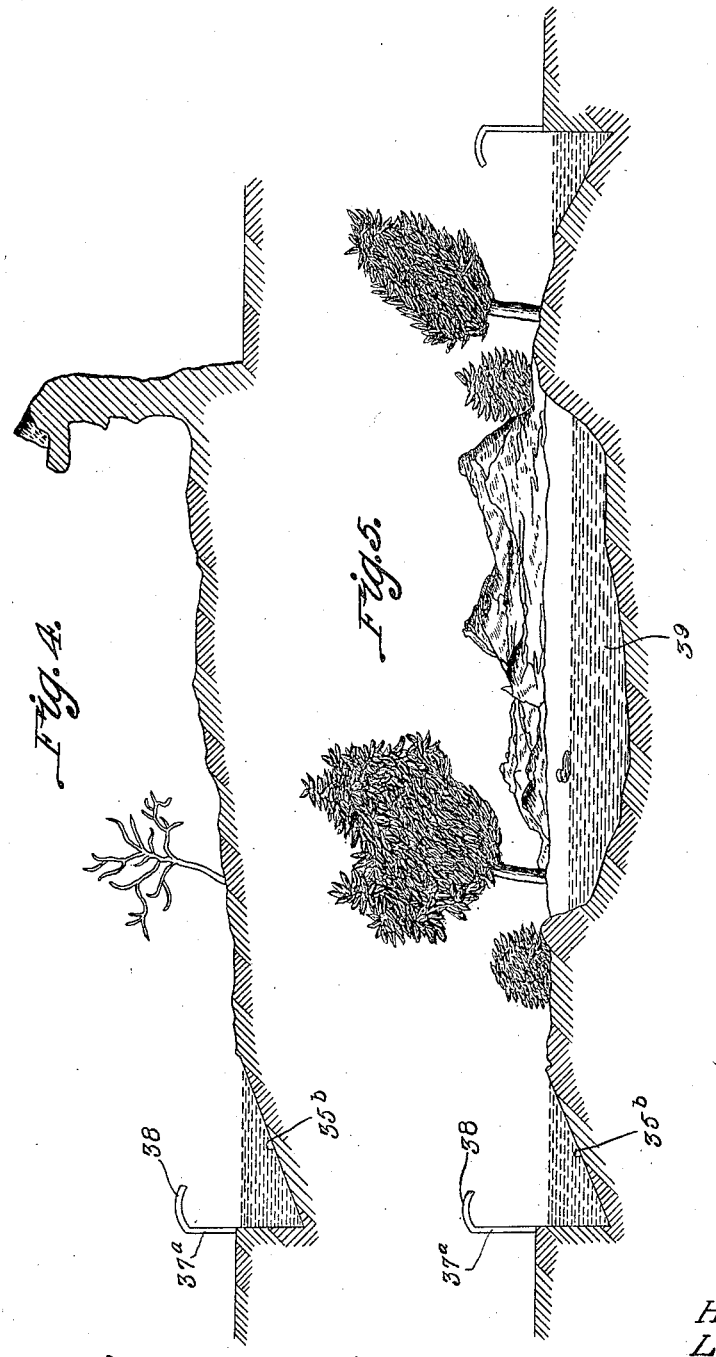

Patented Sept. 9, 1924.

1,508,318

UNITED STATES PATENT OFFICE.

HEINRICH HAGENBECK, OF STELLINGEN, AND LORENZ HAGENBECK, OF LOKSTEDT, NEAR HAMBURG, GERMANY.

ANIMAL INCLOSURE.

Application filed January 14, 1924. Serial No. 686,235.

*To all whom it may concern:*

Be it known that we, HEINRICH HAGENBECK and LORENZ HAGENBECK, citizens of Germany, residing, respectively, at Stellingen and Lokstedt, near Hamburg, Germany, have invented new and useful Improvements in Animal Inclosures, of which the following is a specification.

This invention relates to improvements in inclosures for animals, birds, reptiles and the like, an object being to provide means whereby animals, birds and reptiles may be confined without the use of bars, wires or similar view obstructing restraining means, the invention being especially adapted for zoos and other places of animal exhibition.

Another object of the invention is the provision of an inclosure of this character wherein the different animals, birds and reptiles are effectually separated in a manner to minimize the prominence of the means of separation, while the landscape may be arranged to simulate the character of the country where the particular animals, birds and so forth are usually found, so that they apparently remain in their natural habitat.

Another object of the invention is the provision of means for separating and enclosing the animals in such manner that a panoramic view may be obtained of a part of or the entire exhibition, while the separating and enclosing means remain practically hidden.

With the above and other objects in view, the invention further includes the following novel features and details of construction, to be hereinafter more fully described, illustrated in the accompanying drawings and pointed out in the appended claim.

In the drawings:—

Figure 1 is a plan view of a park or inclosure arranged in accordance with the present invention.

Figure 2 is an enlarged transverse sectional view taken through one of the tracts into which the inclosure is divided.

Figure 3 is a similar view of another tract.

Figures 4 and 5 are like views of other tracts.

Referring in detail to the drawings wherein like characters of reference denote corresponding parts, in Figure 1 there is illustrated a plan view of an exhibition park or zoo, forming an inclosure for various kinds of animals, birds, reptiles, etc. As shown in the plan, the inclosure is surrounded by a drive or boulevard which is indicated at 10 and is divided into separate tracts or inclosures 11, each of which is adapted to contain certain relative species of animals, birds and the like. For example, the inclosure 11$^a$ includes a body of water 12 and is adapted for the accommodation of water fowl and as this body of water passes from the inclosure 11$^a$ to adjacent inclosures and as these inclosures are separated by means which includes walks 13, the body of water is spanned by bridges 14. In addition there may be provided a service yard 15, a reptile house 16, a palm house 17, pergolas 18 and a band stand 19, all of which add to the comfort and attractiveness of the general inclosure. If desired, a parking space 19 may be provided, while a loading platform 20 for a railway may communicate with the interior of the general inclosure by means of a tunnel 21, so that visitors may pass through this tunnel beneath the drive 10 to the various walks 13 which extend around the separate inclosures 11 and 11$^a$.

As a means of separating the various inclosures and of preventing the escape of animals and so forth therefrom without the use of bars or wire restraining devices, each separate inclosure is surrounded by a ditch or moat 22, which may or may not contain water. The width and depth of this moat depends upon the character of the animals occupying the particular inclosure surrounded. As an example, the inclosure for carnivorous animals, such as lions, tigers or other cat animals capable of leaping relatively great distances will have a moat whose width is from 30 to 35 feet more or less, and whose depth is from 15 to 18 feet, or in other words of sufficient width and depth to prevent the animals from leaping the moat or from leaping from the bottom to the top of the moat. The outer wall 23 of the moat is substantially vertical so as to prevent the animals from climbing this wall. Should however, the animals jump or fall into the moat, means are provided for permitting the animal to climb out. This means as shown in Figure 3 of the drawings consists of a passage 24 having a lower entrance 25 positioned adjacent the bottom of the moat and having steps 26 for the animal to ascend. These steps may if desired be covered by a trap door 27 so that the passage is hid from view. The moats are surrounded by walks 28 which may be provided with a rail 29 so as to prevent visitors and others from falling into the moat. It will be apparent from the drawings that the walks 28 are located upon a lower plane than the main portions of the various separate inclosures, and while the said main portions are not of sufficient height to interfere with a proper view of the animals, the difference in height is such as to place the edges of the separating moats below the field of vision so as to render the moats practically invisible to persons standing upon the walks and looking upward to the main portions of the island-like tracts.

The inclosure shown in Figure 3 may if desired be provided with a house 30 for the protection of the animals, the latter gaining access thereto through an opening or openings 31, where they may enter a cage 32. This house is preferably formed of artifical stone or of some other suitable material and its opposite walls are so formed as to prevent the animals from climbing upward. The house is provided with a door 33, so that visitors may enter and view the animals at close range within the cages, while a skylight 34 is provided so that sufficient light may enter the house. The top of the house or skylight may be provided with suitable drainage.

In Figure 2 there is illustrated a cross sectional view through one of the inclosures 11 which is adapted for various kinds of animals such as ruminants, including elephants, hippopotami, rhinoceroses, camels or any kind of wild cattle, also all sorts of wild and domestic goats, sheep and any types of the equs family. Also, this type of inclosure is suitable for monkeys. The inclosure shown in Figure 2 is surrounded by the walk 28 which is separated from the animals by a moat 35 of a slightly different character from the moat shown in Figure 3. This moat has an inclined bottom and a vertical outer wall 36, while the moat is surrounded by a rail 37 for the protection of visitors.

In Figures 4 and 5 the moats 35$^b$ are shown as containing water and the inclosures which they surround are especially adapted for birds, such as water fowl, cranes, pelicans, flamingoes and so forth. The inclosure shown in Figures 4 and 5 is also adapted for reptiles and for this purpose the rails 37$^a$ are provided with inwardly extending overhanging portions 38. A lake 39 may be provided in one of the inclosures.

One of the novel features of the invention resides in the arrangement and construction of the walks and the embankments or restraining walls of the moats, whereby the said walks and moats are on a plane below the major portion of the landscape and an observation point A is provided whereby visitors and others may obtain a panoramic view of the various inclosures with the moats, walks and persons thereon hidden from view, so that the animals and so forth will appear unrestrained and apparently in their natural environment, especially when looking in the direction of the dotted lines A—B and A—D in Figure 1 of the drawings. This is also substantially true when viewing the inclosure from various points around the drive 10.

The invention is susceptible of various changes in its form, proportions and relative arrangemnt of the separate inclosures 11, which may be laid out in various shapes, designs and sizes particularly adapted to the topography of the land and the character and size of the exhibition.

Having described the invention what is claimed is:—

An inclosure for animals, birds, reptiles and the like comprising a tract of land, walks dividing the tract of land into separate island-like tracts and separating moats extending around each island-like tract between said island-like tracts and walks, said walks being upon a lower plane than the main portions of the island-like tracts whereby the edges of the separating moats will be below the field of vision of persons standing upon the walks and looking across the moats upon said island-like tracts.

In testimony whereof we affix our signatures.

HEINRICH HAGENBECK.
LORENZ HAGENBECK.